United States Patent
Hooper et al.

(10) Patent No.: US 6,944,850 B2
(45) Date of Patent: Sep. 13, 2005

(54) HOP METHOD FOR STEPPING PARALLEL HARDWARE THREADS

(75) Inventors: Donald F. Hooper, Shrewsbury, MA (US); Desmond R. Johnson, Rutland, MA (US); James D. Guilford, Northborough, MA (US); Richard D. Muratori, Stow, MA (US)

(73) Assignee: Intel Corporation, Santa Clara, CA (US)

( * ) Notice: Subject to any disclaimer, the term of this patent is extended or adjusted under 35 U.S.C. 154(b) by 535 days.

(21) Appl. No.: 09/746,523

(22) Filed: Dec. 21, 2000

(65) Prior Publication Data

US 2004/0205719 A1 Oct. 14, 2004

(51) Int. Cl.[7] .................................. G06F 9/44
(52) U.S. Cl. ................. 717/129; 717/130; 717/131
(58) Field of Search ............................. 717/124–133, 717/149–161; 712/226–230; 709/106–108; 714/134–135

(56) References Cited

U.S. PATENT DOCUMENTS 5,659,749 A * 8/1997 Mitchell et al. ............ 709/108
5,815,727 A * 9/1998 Motomura ..................... 712/1

OTHER PUBLICATIONS

Schulz et al., "A thread–aware debugger with an open interface", ACM, pp.: 201–211, Aug. 2000.*

Xu et al., "Dynamic Instrumentation of Thread Applications", ACM, pp.: 1–11, May 1999.*

Hardware Reference Manual, "Intel™ IXP1200 Network Processor Hardware Reference Manual", http://www.hcs.ufl.edu/, version 1.0, pp.: 4.1–4.50, Jun. 2000.*

Jacobson et al., "Asynchronous Microengines for Efficient High Level Control", IEEE, pp.: 201–218, 1997.*

* cited by examiner

Primary Examiner—Ted T. Vo
(74) Attorney, Agent, or Firm—Fish & Richardson P.C.

(57) ABSTRACT

A method of debugging software that executes in a multi-threaded processor having a plurality of microengines includes pausing program execution in threads of execution within a target microengine, inserting a segment of executable code into an unused section of the target microengine's microstore, executing the segment of executable code in the target microengine and resuming program execution in the target microengine

14 Claims, 4 Drawing Sheets

HOP METHOD FOR STEPPING PARALLEL HARDWARE THREADS

TECHNICAL FIELD

This invention relates to a hop method for stepping parallel hardware threads.

BACKGROUND OF INVENTION

Parallel processing is an efficient form of information processing of concurrent events in a computing process. Parallel processing demands concurrent execution of many programs in a computer, in contrast to sequential processing. That is, in general all or a plurality of the stations work simultaneously and independently on the same or common elements of a problem.

In a parallel processor where many threads of execution can run simultaneously, there may be a need for debugging software running on selected threads. Debugging is used to determine a cause (or causes) of errors in the processing threads, and to correct the errors.

DETAILED DESCRIPTION

Figure 1:
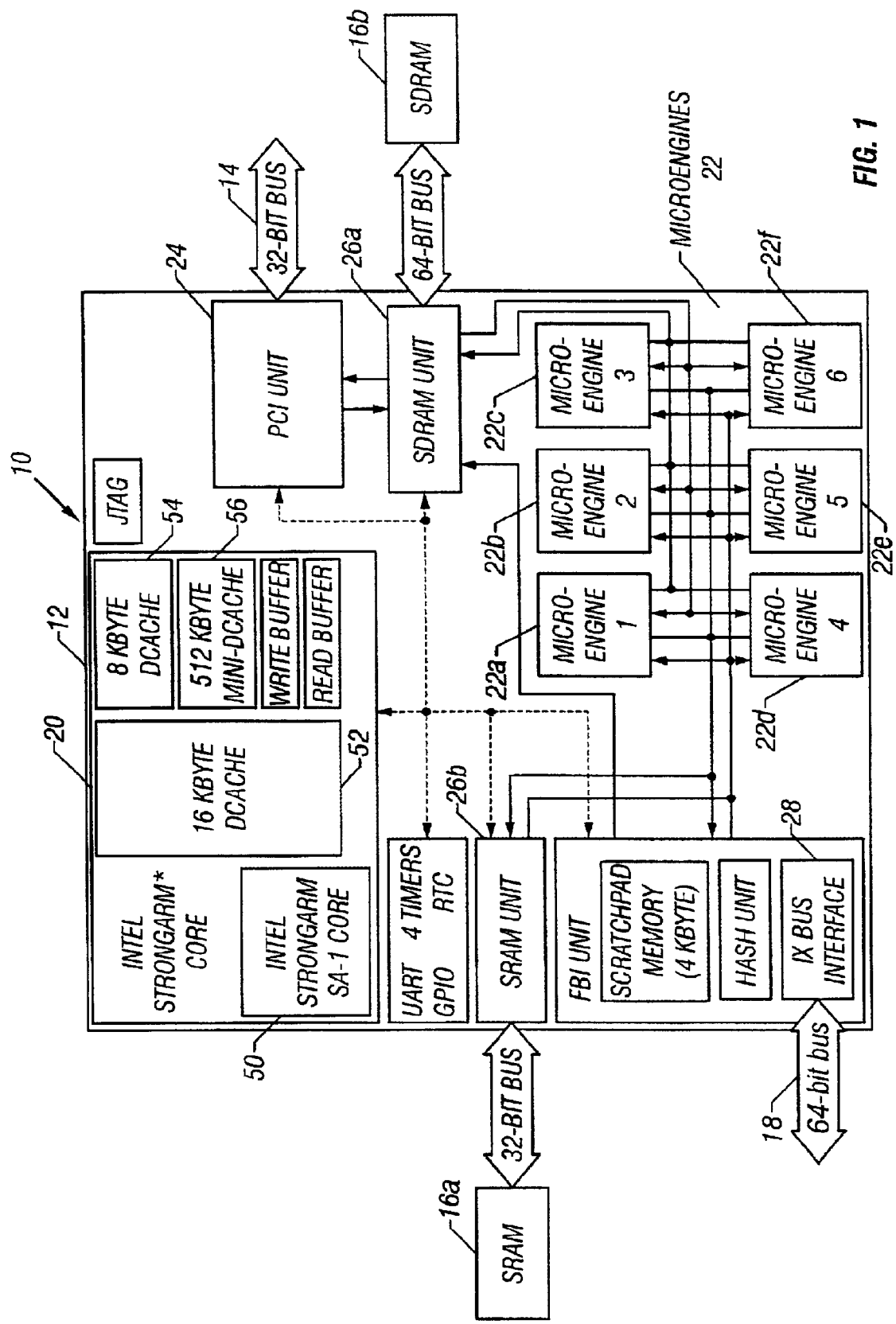
FIG. 1 is a block diagram of a communication system employing a hardware based multithreaded processor.

Referring to FIG. 1, a communication system 10 includes a parallel, hardware based multithreaded processor 12. The hardware-based multithreaded processor 12 is coupled to a bus 12, such as a PCI bus, a memory system 16 and a second bus 18. The system 10 is especially useful for tasks that can be broken into parallel subtasks or functions. Specifically, hardware-based multithreaded processor 12 is useful for tasks that are bandwidth oriented rather than latency oriented. The hardware-based multithreaded processor 12 has multiple microengines 22, each with multiple hardware controlled threads (also referred to as contexts) that can be simultaneously active and independently work on a task.

The hardware-based multithreaded processor 12 also includes a core processor 20 that assists in loading microcode control for other resources of the hardware-based multithreaded processor 12 and performs other general purpose computer-type functions, such as handling protocols, interrupts, exceptions, extra support for packet processing where the microengines pass the packets off for more detailed processing, such as in boundary conditions, and so forth. In an embodiment, the core processor 20 is a Strong ARM® (ARM® is a trademark of ARM Limited, United Kingdom) based architecture. The core processor 20 has an operating system. Through the operating system, the core processor 20 can call functions to operate on microengines 22. The core processor 20 can use any supported operating system, preferably a real-time operating system. For a core processor 20 implemented as a Strong ARM® architecture, operating systems such as Microsoft NT Real-Time, VXWorks and µCUS, a freeware operating system available over the Internet, can be used.

As mentioned above, the hardware-based multithreaded processor 12 includes a plurality of functional microengines 22a–f. Functional microengines (microengines) 22a–f each maintains a number of program counters in hardware and states associated with the program counters. Effectively, a corresponding plurality of sets of threads can be simultaneously active on each of the microengines 22a–f while only one is actually operating at any one time.

In an embodiment, there are six microengines 22a–f, as shown. Each of the microengines 22a–f has capabilities for processing four hardware threads. The six microengines 22a–f operate with shared resources, including memory system 16 and bus interfaces 24 and 28. The memory system 16 includes a synchronous dynamic random access memory (SDRAM) controller 26a and a static random access memory (SRAM) controller 26b. SRAM memory 16a and SRAM controller 26a are typically used for processing large volumes of data, e.g., processing of network payloads from network packets. The SDRAM controller 26b and SDRAM memory 16b are used in a networking implementation for low latency fast access tasks, e.g., accessing lookup tables, memory from the core processor, and so forth.

The six microengines 22a–f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16b. The microengines 22a–f can execute memory reference instructions to either the SDRAM controller 26a or SRAM controller 26b.

Advantages of hardware multithreading can be explained by SRAM or SDRAM memory accesses. As an example, an SRAM access requested by a thread_0, from a microengine will cause the SRAM controller 26b to initiate an access to the SRAM memory 16a. The SRAM controller 26b controls arbitration for the SRAM bus, accesses the SRAM 16a, fetches the data from the SRAM 16a, and returns data to a requesting microengine 22a–f. During an SRAM 26b access, if the microengine, e.g. microengine 22a, had only a single thread that could operate, that microengine would be dormant until data was returned from the SRAM 26b. By employing hardware context swapping within each of the microengines 22a–f, the hardware context swapping enables only contexts with unique program counters to execute in that same microengine. Thus, another thread, e.g., thread_1 can function while the first thread, e.g., thread_0, is awaiting the read data to return. During execution, thread_1 may access the SDRAM memory 26a. While thread_1 operates on the SDRAM unit, and thread_0 is operating on the SRAM unit, a new thread, e.g., thread_2 can now operate in the microengine 22a. Thread_2 can operate for a certain amount of time, until it needs to access memory or perform some other-long latency operation, such as making an access to a bus interface. Therefore, simultaneously, the processor can have a bus operation, an SRAM operation and SDRAM operation all being completed or operated upon by one microengine 22a and have one or more threads available to process more work in the data path.

Each of the microengines 22a–f includes an arbiter that examines flags to determine the available threads to be operated upon. Any thread from any of the microengines 22a–f can access the SDRAM controller 26a, SRAM controller 26b or bus interface. The memory controllers 26a and 26b each include a number of queues to store outstanding memory reference requests. The queues either maintain order of memory references or arrange memory references to optimize memory bandwidth. For example, if a thread_0 has no dependencies or relationship to a thread_1, there is no reason that thread_1 and thread_0 cannot complete their memory references to the SRAM unit 26b out of order. The microengines 22a–f issue memory reference requests to the memory controllers 26a and 26b. The microengines 22a–f flood the memory subsystems 26a and 26b with enough memory reference operations such that the memory subsystems 26a and 26b become the bottleneck for processor 12 operation. Microengines 22a–f can also use a register set to exchange data.

The core processor 20 includes a RISC core 50, implemented in a five-stage pipeline performing a single cycle shift of one operant or two operants in a single cycle, provides multiplication support and 32-bit barrel shift support. This risc core 50 is a standard Strong Arm® architecture, but is implemented with a five-stage pipeline for performance reasons. The core processor 20 also includes a 16-kilobyte instruction cache 52, an 8-kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus.

Figure 2:
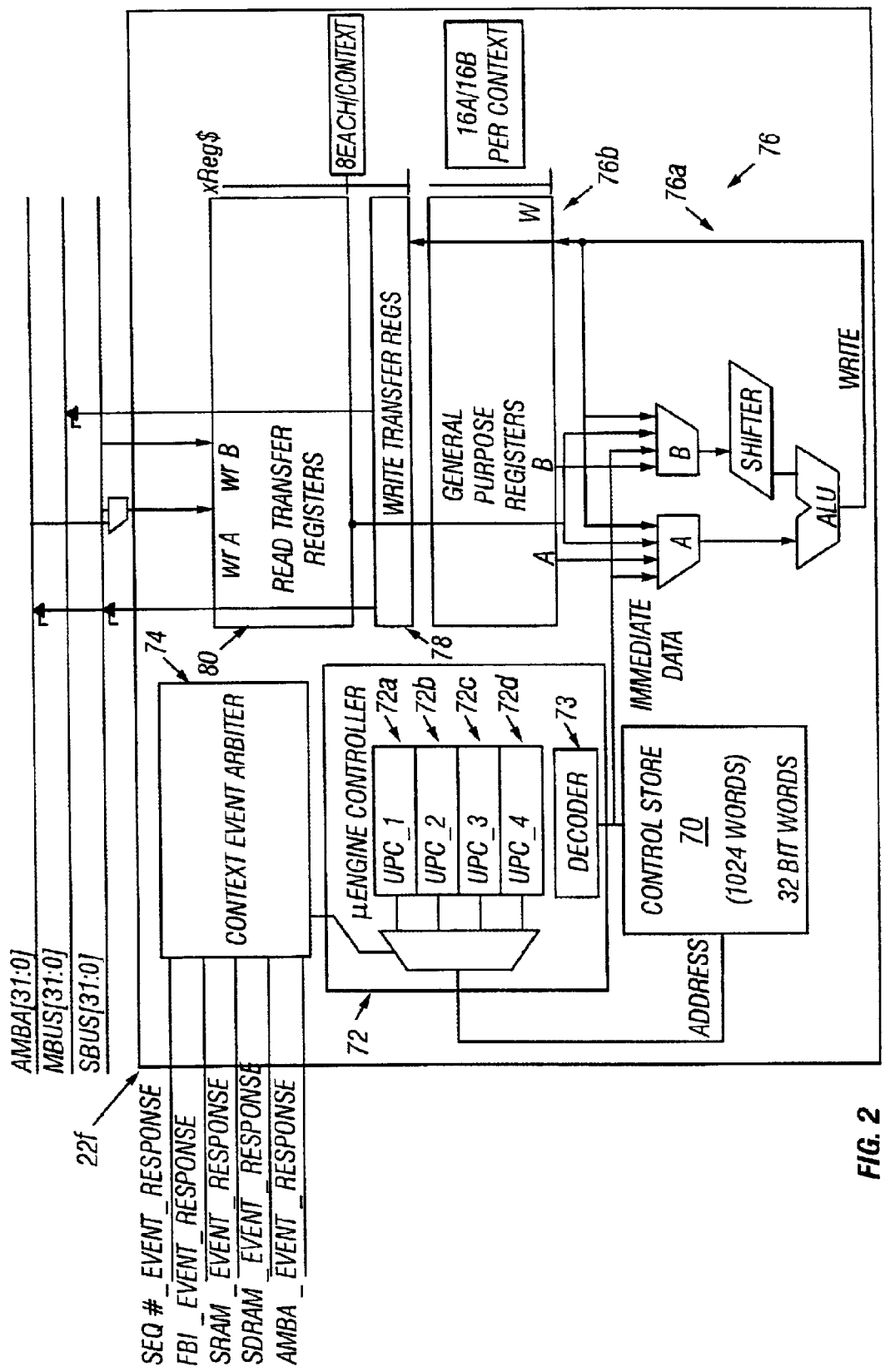
FIG. 2 is a block diagram of a microengine functional unit employed in the hardware based multithreaded processor of FIGS. 1 and 2.

Referring to FIG. 2, an exemplary one of the microengines, microengine 22f is shown. The microengine 22f includes a control store 70 which, in an implementation, includes a RAM of here 1,024 words of 32-bits each. The RAM stores eight microprograms. The microprogram is loadable by the core processor 20. The microengine 22f also includes controller logic 72. The controller logic 72 includes in instruction decoder 73 and program counter units 72a–d. The four program counters 72a–d are maintained in hardware. The microengine 22f also includes context event switching logic 74. Context event switching logic 74 receives messages from each of the shared resources, e.g., SRAM 16a, SDRAM 16b, or core processor 20, control and status registers, and so forth. These messages provide information on whether a requested function has completed. Based on whether or not a function requested by a thread (or context) has completed a signaled completion, the thread needs to wait for that completion signal, and if the thread is enabled to operate, then the thread is placed on an available thread list (not shown). The microengine 22f can have a maximum of four threads available in the example of FIG. 2.

In addition to event signals that are local to an executing thread, the microengines 22 employ signaling states that are global. With signaling states, an executing thread can broadcast a signal state to all microengines 22. Receive request available signal, any and all threads in the microengines can branch on these signaling states. These signaling states can be used to determine the availability of a resource or whether a resource is due for servicing.

The context event logic 74 has arbitration for the four threads in the example. In an embodiment, the arbitration is a round robin mechanism. Other techniques could be used, including priority queuing or weighted fair queuing. The microengine 22f also includes an execution box (EBOX) datapath 76 that includes an arithmetic logic unit 76a and general purpose register set 76b. The arithmetic logic unit 76a performs arithmetic and logical functions as well as shift functions. The register set 76b has a relatively large number of general purpose registers. General purpose registers are windowed so that they are relatively and absolutely addressable.

The microengine 22f also includes a write transfer register stack 78 and a read transfer stack 80. These registers 78 and 80 are also windowed so they are relatively and absolutely addressable. The write transfer register stack 78 is where write data to a resource is located. Similarly, the read register stack 80 is for returned data from a shared resource. Subsequent to, or concurrent with data arrival, an event signal from the respective shared resource, e.g., the SRAM controller 26b, the SDRAM controller 26a, or core processor 20, will be provided to context event arbiter 74 which will then alert the thread is available or has been sent. Both transfer register banks 78 and 80 are connected to the execution box 76 through a datapath. In an implementation, the read transfer register 80 has sixty-four registers and the write transfer register 78 has sixty-four registers.

Each microengine 22a–f supports multi-threaded execution of four contexts. One reason for this is to allow one thread to start executing just after another thread issues a memory reference and must wait until that reference completes before doing more work. This behavior is critical to maintaining efficient hardware execution of the microengines, because memory latency is significant. Stated differently, if only a single thread execution was supported, the microengines would sit idle for a significant number of cycles waiting for references to return and thus reduce overall computational throughput. Multithreaded execution involves all microengines to hide memory latency by performing useful, independent work across several threads.

When errors occur in software running in one or more of the threads of execution, there is a need for debugging the software running on selected threads to determine a cause (or causes) of the errors and to aid a software developer to correct the errors.

Figure 3:
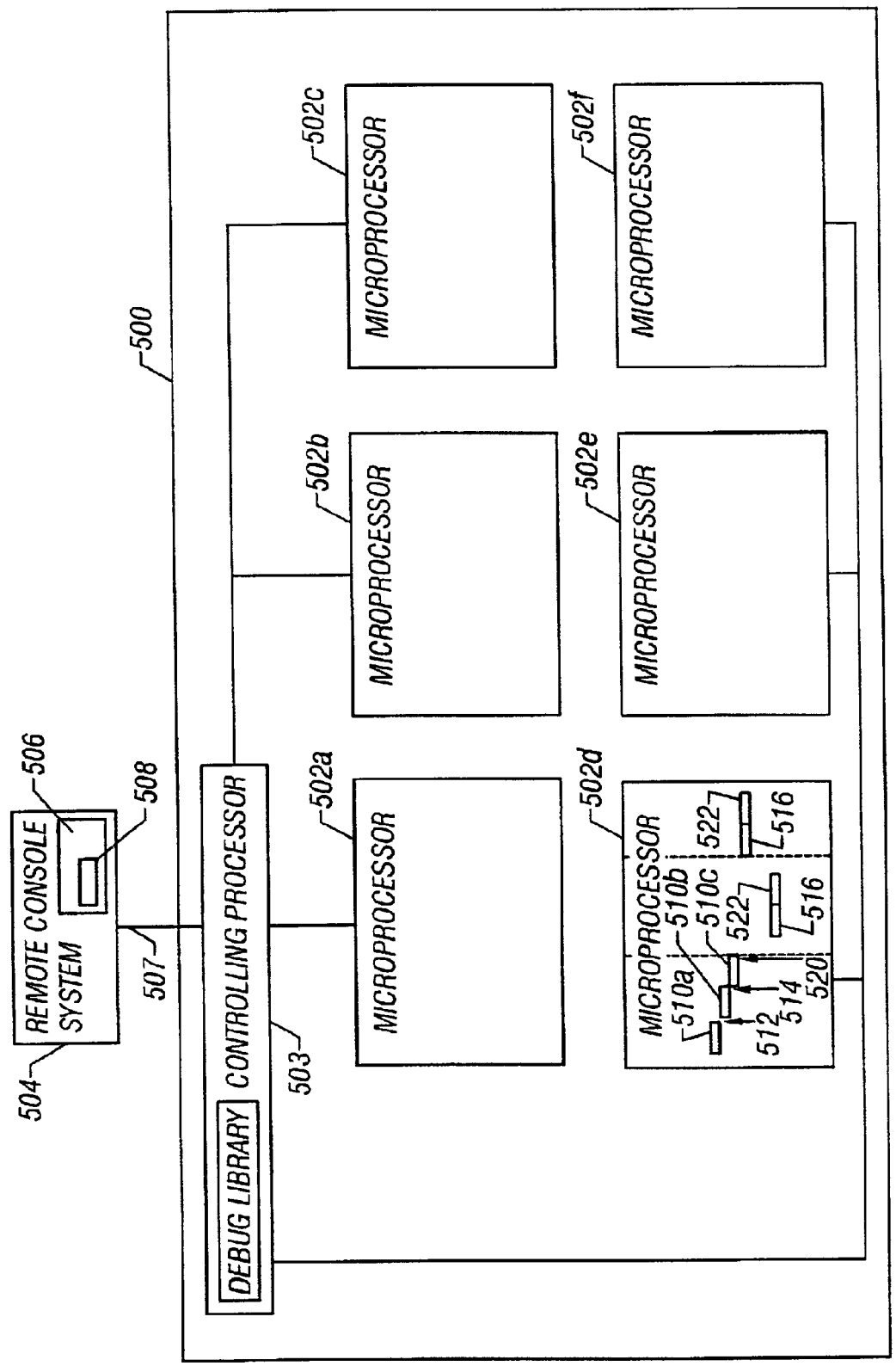
FIG. 3 is a block diagram of a hardware based multithreaded processor adapted to enable hop segment insertions.

Referring to FIG. 3, a parallel processor 500 adapted to enable hop segment insertions includes six microengines 502a, 502b, 502c, 502d, 502e and 502f and a controlling processor 503. Parallel processor 500 is configured to act as a hop engine. The controlling processor includes a link 507 to a remote console system 504. The remote console system 504 includes a storage subsystem 506. The remote console system 504 also includes an input/output device (not shown) to enable a user to interact with the remote console system 504 and controlling processor 503.

Multiple microengine threads run on each of the microengines 502a–f) above referred to as microprocessors). For example, microengine 502d includes three microengine threads 510a, 510b and 510c. One thread runs at a time in the microengine 502d, until the microengine 502d permits a context swap, then another thread executes. Context swapping or switching refers to the point at which execution in one thread ceases and execution of another thread begins. In the example, thread 510a executes until a context swap 512. At the context swap 512 thread 510a stops and thread 510b executes until a context swap 514, when thread 510b stops and thread 510c executes. Each of the threads of execution 510a–c has its own independent Program-Counter, Status Registers, and General Purpose Registers.

As stated previously, after a series of instructions within an active context the active context will swap out. On a following cycle, the next context can run without delay. This mode of operation is generally referred to as hardware multi-threading.

While in a debug mode, the parallel processor 500 operates as follows. The controlling processor (also referred to as the debug processor) 503 is controlled by the remote console system 504 that responds to user commands. A user (not shown) selects a pause command from the remote console system 504 and sends it to the debug processor 503. The debug processor 503 sends the pause command to the microengine 502d, for example. In addition to the pause command, the user selects hop code 516 from a debug library 518. Hop code is a series of instructions capable of executing within the microengine 502d. Hop code is used in debugging the microengine 502d. For example, the hop code can write to specific registers, enabling their examination during execution. In another example, the hop code may provide the user inspection of registers and other storage to determine if the program is behaving correctly.

The pause command causes the microengine 502d to cease execution of all threads 510a–c at a context swap 520. At the context swap 520, hop code 516 is inserted into an unused section of the target thread's allocation of microstore in the corresponding microengine. The hop code 516 will instruct the microengine (target processor) 502d to become disabled/paused the next time any of its contexts 510a–c has been swapped out. The hop segment 516 will then branch back to the program location prior to the diversion of the thread, allowing a normal program flow 522. The controlling processor 503 monitors the target processor 502d to determine where it paused.

Figure 4:
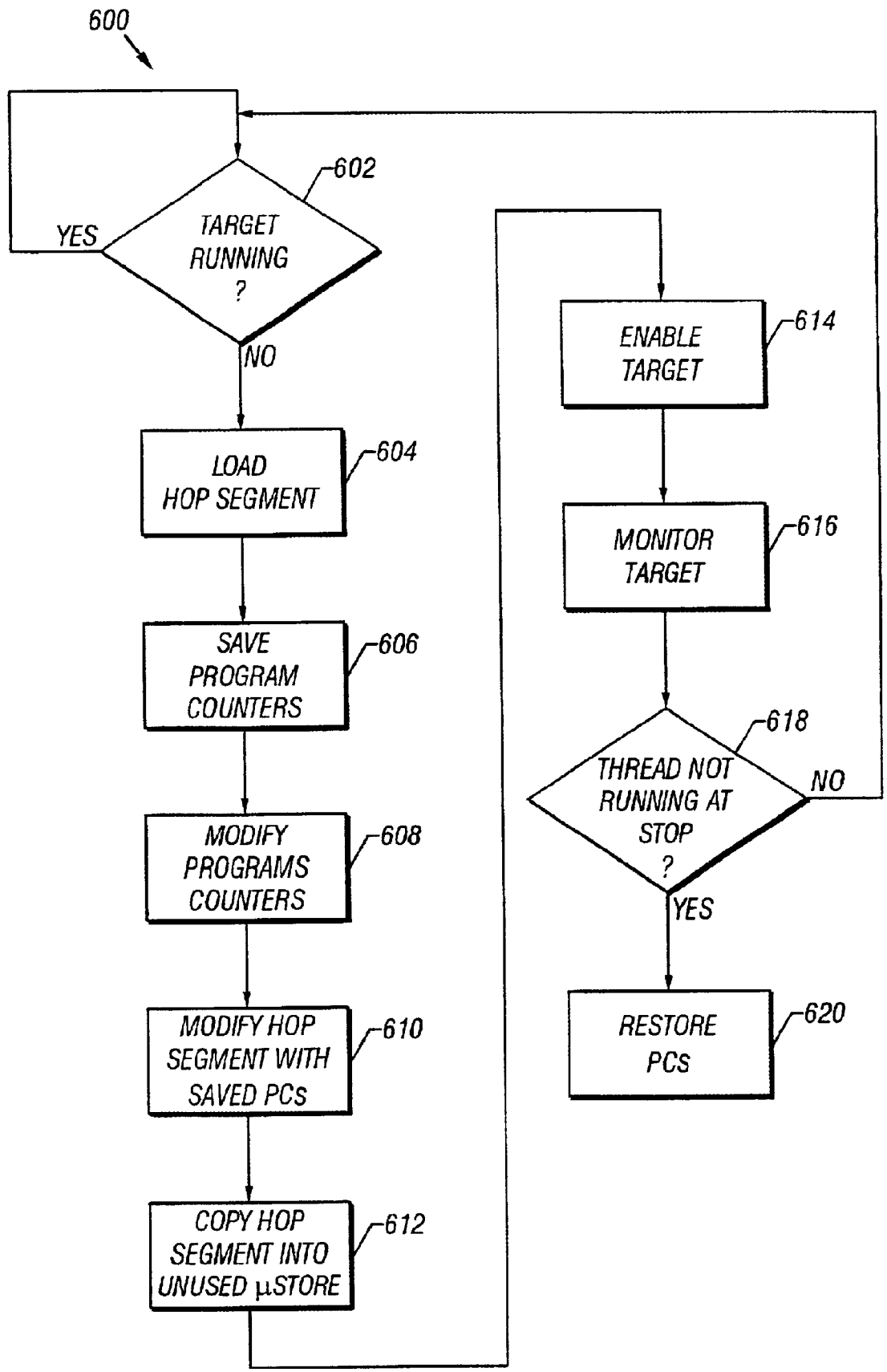
FIG. 4 is a flow chart of a hop method for stepping parallel hardware threads from a debug console.

Referring to FIG. 4, a process 600 that executes in processor 500 to stop execution of parallel hardware threads in a target processor from a debug console is shown. The =process 600 includes monitoring 602 the target processor to determine if the target processor is running. The process 600 will stay monitoring 602. If at any point the target processor is not running, the process 600 loads 604 hop instructions from a debug library. The process 600 saves 606 the program counters for the threads and modifies 608 the target processor's program counters to jump to the start of the hop instructions. The process 600 modifies 610 the hop instructions to branch to the saved program counters. The process 600 copies 612 the hop instructions to the unused segment of microstore in the target processor and enables 614 the target processor to resume processing by setting its enable bit.

The process 600 monitors 616 the target processor to determine 618 when it has stopped. When the target processor stops, the process 600 determines 620 which threads of the target processor have not run and restores 622 their program counters.

The process 600 can control the number of microengines, causing the microengines to execute hop instructions in unison. In addition, the process 600 can start and stop selected bus ports with each hop.

An embodiment of the invention has been described. =Nevertheless, it will be understood that various modifications may be made without departing from the spirit and scope of the invention. Accordingly, other embodiments are within the scope of the following claims.

What is claimed is:

1. A method comprising:

in a parallel processor comprising a controlling processor linked to a remote console system and a plurality of micro engines, each of the micro engines comprising a plurality of executable threads, determining if one of the plurality of threads is executing in a target micro engine;

in response to determining, pausing execution of the threads;

loading a series of hop instructions from a debug library;

storing program counters for the threads;

modifying the program counters of the target micro engine to jump to a start of the series of hop instructions; and modifying the series of hop instructions to return to the stored program counters; and copying the series of hop instructions to an unused segment of micro store in the target micro engine;

executing the series of hop instructions.

2. The method of claim 1 further comprising resuming execution of the threads in the target micro engine using the stored program counters.

3. The method of claim 1 wherein pausing comprises receive a pause command from the remote console system.

4. The method of claim 1 wherein the series of hop instructions are selected by a user of the remote console system.

5. The method of claim 1 wherein the series of hop instructions control a start and a stop of selected bus ports with each hop.

6. The method of claim 1 further comprising:

modifying the program counters of the plurality of micro engines to jump to a start of the series of hop instructions; and modifying the series of hop instructions to return to the stored program counters; and copying the series of hop instructions to an unused segment of micro store in the micro engines;

executing the series of hop instructions in the micro engines in unison.

7. The method of claim 6 further comprising resuming execution of the threads in the plurality of micro engines using the stored program counters.

8. A processor that can execute multiple contexts comprising and that comprises:

a register stack;

a program counter for each executing context;

an arithmetic logic unit coupled to the register stack and a program control store that stores a command that causes the processor to:

determine if one of the multiple contexts is executing in a target micro engine;

in response to determining pause execution of the multiple contexts;

load a series of hop instructions from a debug library;

store program counters for the multiple contexts;

modify the program counters of the target micro engine to jump to a start of the series of hop instructions; and modify the series of hop instructions to return to the stored program counters; and copy the series of hop instructions to an unused segment of a micro store in the target micro engine;

execute the series of hop instructions.

9. The processor of claim 8 wherein the command further causes the processor to:

resume execution of the contexts in the target micro engine using the stored program counters.

10. The processor of claim 8 wherein pausing comprises receiving a pause command from a remote console system.

11. The processor of claim 10 wherein the series of hop instructions are selected by a user of the remote console system.

12. The processor of claim 8 wherein the series of hop instructions control a start and a stop of selected bus oils with each hop.

13. The processor of claim 8 wherein the command further causes the processor to:
- modify the program counters of the plurality of micro engines to jump to a start of the series of hop instructions;
- modify the series of hop instructions to return to the stored program counters; and
- copy the series of hop instructions to an unused segment of micro store in the micro engines;
- execute the series of hop instructions in the micro engines in unison.

14. The processor of claim 13 wherein the command further causes the processor to: resume execution of the threads in the plurality of micro engines using the stored program counters.

* * * * *